United States Patent [19]

Gustus

[11] 3,784,843

[45] Jan. 8, 1974

[54] CONDITION RESPONSIVE CIRCUIT WITH CAPACITIVE DIFFERENTIAL VOLTAGE

[75] Inventor: C. Douglas Gustus, Bloomington, Minn.

[73] Assignee: Honeywell Inc., Minneapolis, Minn.

[22] Filed: July 21, 1972

[21] Appl. No.: 274,125

[52] U.S. Cl. .................. 307/117, 219/497, 219/501

[51] Int. Cl. .................. H02h 5/04

[58] Field of Search .................. 302/116, 117; 219/497, 499, 501, 505

[56] References Cited

UNITED STATES PATENTS

| | | | |
|---|---|---|---|
| 3,553,429 | 1/1971 | Nelson | 219/497 |
| 3,149,224 | 9/1964 | Horne et al. | 219/501 |
| 3,329,887 | 7/1967 | Schaeve | 219/497 |

OTHER PUBLICATIONS

Petersen, J. J., "Temperature Control Circuit," IBM Tech. Bull. Vol. 8, No. 5, Oct. 1965. p. 808, 809.

*Primary Examiner*—David Smith, Jr.
*Attorney*—Lamont B. Koontz et al.

[57] ABSTRACT

A condition responsive circuit, disclosed as including a temperature responsive element, is adapted to be connected to by a pair of terminals by an alternating current load and to a source of alternating current voltage. The condition responsive circuit operates through a differential amplifier to control a solid state switch, shown as a silicon controlled rectifier. This solid state switch in turn operates further solid state switching to control the load. A capacitor for creating a differential voltage in the input circuit of the differential amplifier is connected by a discharge circuit to the silicon controlled rectifier so that the voltage on the capacitor is discharged every time the silicon controlled rectifier is conductive.

6 Claims, 1 Drawing Figure

PATENTED JAN 8 1974 3,784,843
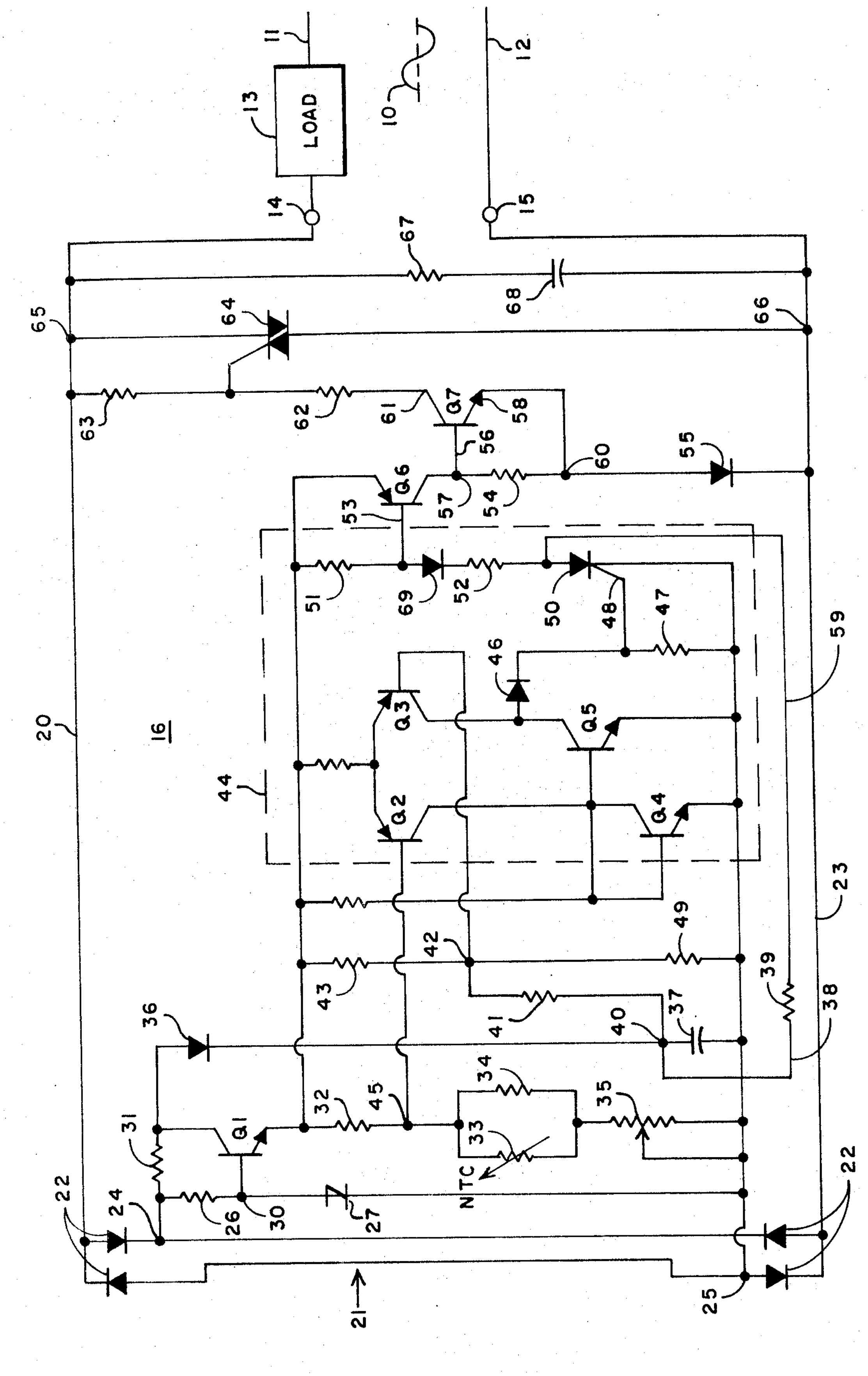

CONDITION RESPONSIVE CIRCUIT WITH CAPACITIVE DIFFERENTIAL VOLTAGE

CROSS REFERENCE TO RELATED APPLICATION

The present application is an improvement on an invention disclosed and claimed in United States Patent application Ser. No. 169,565 filed on Aug. 5, 1971 and entitled "Condition Responsive Circuit With Limited Internal Dissipation now U.S. Pat. No. 3,694,663." This earlier filed application was filed in the name of Balthasar Hubert Pinckaers and is assigned to the assignee of the present application.

BACKGROUND OF THE INVENTION

In condition control equipment, such as thermostats, it is normally desirable to have some form of differential in the operating point around which the control operates. In the case of a mechanical thermostat, a natural mechanical differential between the "off" and "on" states normally exists. In the case of electronic thermostats, or solid state thermostats, some means must be provided to create a differential in the operating points from the "off" to "on" condition. The desirability and necessity of providing this differential has been recognized and has been provided by various means. Two such means are shown in two different United States patents such as U.S. Pat. No. 3,243,609 issued on Mar. 29, 1966 to A. D. Kompelien and U.S. Pat. No. 3,514,628 issued on May 26, 1970 to B. H. Pinckaers. The Kompelien patent discloses the use of a voltage generated across a zener diode 124 as a means of obtaining a differential in a phase sensitive type of device. The Pinckaers patent discloses the use of a capacitor 70 which is charged after the load 12 is energized by the conduction of a silicon controlled rectifier 60. In the Pinckaers patent the differential is then removed by a slow discharge path created by the resistor 71 and 24. An improved method of creating the differential is disclosed in the present invention.

SUMMARY OF THE INVENTION

The present invention is to an electronic condition responsive circuit or thermostat that utilizes a capacitor which is charged upon the initial energization of the device to create a differential in the operating point of a differential amplifier circuit. The differential creating capacitor is immediately discharged at any time the condition control system has an output.

BRIEF DESCRIPTION OF THE DRAWING

The single FIGURE of the present application is a complete schematic drawing of a two wire type thermostat having an off-on control action, as disclosed in the cross referenced Pinckaers application, but which has been improved in its operating function by a special discharge circuit.

DESCRIPTION OF THE PREFERRED EMBODIMENT

A low voltage source of alternating current 10 is disclosed and ideally would be supplied from the secondary winding of a step-down control transformer. The source 10, while disclosed as an alternating current voltage, more generally is a periodically reversing voltage level and is supplied by conductors 11 and 12, through a load 13 to a pair of terminals 14 and 15 of a condition responsive circuit generally shown at 16.

Terminal 14 is connected by conductor 20 to rectifier means 21, made up of a full wave bridge including four diodes 22, which in turn are connected by conductor 23 back to the terminal 15. With this arrangement, a full wave rectified, but unfiltered, voltage is available between junctions 24 and 25.

Junction 24 is connected to a first impedance 26, in the form of a resistor, which in turn is connected to a voltage breakdown means 27, disclosed as a four-layer diode. The first circuit means made up of the impedance 26 and the voltage breakdown means 27 are connected in series across the junctions 24 and 25. At the beginning of each half cycle of the applied line voltage, a rising voltage is applied across the breakdown means 27 until its breakdown voltage has been reached, at which time it suddenly conducts thereby substantially shorting a junction 30, between the impedance means 26 and the voltage breakdown means 27, to the voltage at the junction 25.

A second circuit means is connected to junction 24 through an impedance or resistor 31 to a solid state switch means or transistor Q1, and then to a condition responsive means made up of a resistor 32 connected in series with the parallel combination of a temperature sensitive resistance 33 and a linearizing or characterizing resistor 34 along with a set point potentiometer 35 that in turn is connected back to junction 25. The temperature responsive or condition responsive element 33 has been disclosed in the present embodiment as a negative temperature coefficient thermistor and provides a temperature measuring function in a well-known fashion.

A diode 36 and series capacitor 37 are connected across the transistor Q1 and the voltage divider network made up of resistors 32, 33, 34, and 35. At a junction point 40 between the diode 36 and the capacitor 37, a resistor 41 is provided to a junction point 42 between a pair of resistors 43 and 49 that act as a voltage divider network, and one part of an input means for a switching circuit means or differential amplifier means generally disclosed at 44. The balance of the input means for the circuit means 44 at a junction 45 between resistor 32 and the parallel combination of the negative temperature coefficient resistor 33 and the characterizing resistor 34.

The switching circuit means 44 is made up of a differential amplifier including transistors Q2 and Q3 along with current comparing transistors Q4 and Q5. The current comparing transistors Q4 and Q5 have an output through a diode 46 and resistor 47 to a gate 48 of a silicon controlled rectifier or solid state switch means 50 that is connected through a pair of resistors 51 and 52 that form part of an output circuit means for the swtiching circuit means 44. The switching circuit means 44 will only briefly be discussed in connection with the operation of the present invention as this switching circuit means in and of itself is known in the patent art. This switching circuit means is fully disclosed and explained in the previously mentioned U.S. Pat. No. 3,514,628.

Junction 40 is connected by a conductor 38 and an impedance or resistor 39 along with conductor 59 to junction between the solid state switch means 50 and resistor 52. A diode 69 is placed between resistors 51 and 52 to block a possible accidental or "sneak" path for the discharge of capacitor 37.

The junction of resistor 51 and diode 69 is connected by conductor 53 to a transistor Q6 and through a resistor 54 and diode 55 to provide a current path from the transistor Q1 through the transistor Q6, resistor 54 and diode 55. The resistor 54 acts as a bias for a transistor Q7 that provides a unique function in the present system. Transistor Q7 has a base 56 connected at junction 57 between the collector of transistor Q6 and one end of resistor 54. The emitter 58 of transistor Q7 is connected to a junction 60 between the resistor 54 and the diode 55. The collector 61 of transistor Q7 is connected through a voltage divider made up of resistors 62 and 63 to provide a gating signal to a solid state power switching means 64, disclosed as a triac. The solid state power switching means is connected to junctions 65 and 66 directly to the terminals 14 and 15. Also connected across the terminals 14 and 15 are resistor 67 and a capacitor 68 which are for transient suppression in a well-known fashion.

OPERATION

Before explaining the detailed operation of the circuit, a few typical values for certain of the components and voltages will put the operation into better perspective. The alternating sine wave current source voltage 10 has in a typical installation a peak value of 34 volts. Other important values are the resistance values of impedances 26 and 31. The resistor 26 has a value of 8,200 ohms, while the resistor 31 has a resistance value of 150 ohms. The four-layer breakdown device 27 has a characteristic wherein the device breaks over and becomes substantially a zero voltage drop upon reaching a level of 7.3 volts.

It will be first assumed that load 13 is an alternating current type of load that controls a heating source, and that at the application of power to the system no heat is being called for due to the temperature at the negative temperature coefficient thermistor 33 being at or above the set point. It will be further assumed that the voltage between terminals 14 and 15 is just beginning to provide terminal 14 with a rising voltage potential with respect to terminal 15.

Under the conditions set forth, a current will begin to flow in conductor 20, with conductor 20 positive with respect to conductor 23. The current will flow through the upper right hand diode of the full wave rectifier bridge 21 and is applied as a rising potential between the junctions 24 and 25. Current will flow through resistor 31 and diode 36 to charge capacitor 37 thereby creating a differential voltage for the input to the amplifier means 44. The rising potential between junctions 24 and 25 will cause the transistor Q1 to turn "on" by furnishing base drive current through resistor 26 and current will be conducted between the collector and emitter of transistor Q1 through the resistor 32, the temperature of responsive resistor 33, and the set point potentiometer 35. At this same time, the voltage at junction 30 will be rising but will be below the breakdown potential of the four-layer diode 27. The current flowing through transistor Q1 also provides current to the voltage divider made up of resistors 43 and 49 thereby establishing a voltage potential at the junction 42. The switching circuit means or amplifier means 44 compares the voltage between the junctions 42 and 45 to determine whether an output is necessary. This voltage is affected by the charge on capacitor 37. It was originally assumed that no output was necessary, thereby leaving the differential amplifier made up of transistors Q2 and Q3 in such a state as to provide no output to the gate resistor 47 of the silicon controlled rectifier 50. The silicon controlled rectifier 50 therefore does not begin to conduct and the voltage at junction 30 continues to rise. Also capacitor 37 remains charged. As soon as the voltage at junction 30 reaches the breakover potential of the four-layer diode 27, the four-layer diode suddenly begins to conduct and turns "on" to become substantially neglible in voltage drop. This shorts the junction 30 to the potential at junction 25 and the transistor Q1 ceases to conduct thereby diverting what little current flows through the resistors 26. Up until this time, current had been flowing through the relatively low resistance value of resistor 31, but the resistor is no longer the primary conduction path for the balance of the half cycle of applied voltage. The resistor 26 becomes a conduction path and it is a relatively high impedance thereby limiting the current drawn by the circuit to a very low value. The dissipation of the system therefore is maintained at a very low value when the load 13 is not being called on to supply heat for the system. This same function occurs on the reverse half cycle since the full wave bridge means 21 reverses the voltage applied so that the junctions 24 and 25 still see a voltage rise at 24 with respect to junction 25.

If it is now assumed that it is desirable to energize the load 13, that is, heat is needed as sensed by the negative temperature coefficient thermistor 33, a different function will occur. As the voltage at terminal 24 rises with respect to terminal 25, transistor Q1 begins to conduct as previously explained. Capacitor 37 is still charged. The differential amplifier Q2 and Q3 in the differential amplifier means 44 now provides an output of current flow through the diode 46 and the resistor 47 to provide a sufficient gating current for the silicon controlled rectifier 50. This almost immediately discharges capacitor 37 through the silicon controlled rectifier 50 and establishes a differential action for the device.

Because of the bridge rectifier means 21, the voltage applied across the silicon controlled rectifier 50, along with the differential amplifier or switching circuit means 44, is always of the same polarity and the silicon controlled rectifier conducts thereby generating a voltage drop across the resistor 51 which in turn causes the transistor Q6 to conduct. Conduction of current through transistor Q6 causes a current to flow through resistor 54 and diode 55 which generates a positive potential between the base 56 and emitter 58 whereby driving transistor Q7 into conduction. The conduction of tansistor Q7 is through the resistor 63, resistor 62, collector 61, and through the emitter 58 to the diode 55. This current flow generates a voltage drop across resistor 63 that gates the solid state power switching means or triac 64 into conduction. The conduction of triac 64 substantially shorts the terminals 14 and 15 to one another thereby applying full potential from conductors 11 and 12 through the load 13 fully energizing this load.

On reversal of polarity of the voltage between terminals 14 and 15 a unique event occurs in the present system, above and beyond that previously described. The voltage applied across the triac 64 has been reversed but the output of current flow in the transistor Q6 which is used to turn on transistor Q7 has remained the same due to the full wave rectifier bridge 21. Under these conditions, when a call for the operation of load 13 is still present, current still flows through the transistor Q6 from emitter to collector, but now the voltage appearing across conductors 20 and 23 has reversed in polarity with conductor 23 being positive. The transistor Q7 at this time no longer acts as an ordinary transistor, but acts as a steering diode allowing current flow from the emitter of Q6 to the junction 57 and then to the base 56 of transistor Q7 and out of the collector of Q7. Current thus flows through the resistor 62 and the resistor 63 to the negative potential on conductor 20. This current flow causes the triac 64 to again be gated into conduction and it shorts the terminals 14 and 15.

The transistor Q7 in this reverse voltage function acts as a steering diode rather than a conventional transistor and therefore provides a unique function. When the polarity across the transistor Q7 is positive on conductor 20 with respect to 23, it acts as a conventional transistor but when the potential is reversed it acts merely as a steering diode allowing current to flow from the base 56 to the collector 61 thereby providing the necessary output triggering signal for the solid state power switching means 64. The input circuits have remained unchanged. Capacitor 37 acts as a differential creating capacitor on both half cycles of the applied alternating current.

The present circuit provides a unique arrangement for discharging a capacitor created differential so that the solid state power switch means can be appropriately triggered across the terminals 14 and 15 to either control the load or leave the load deenergized as is demanded by the negative temperature coefficient thermistor 33.

The embodiments of the invention in which an exclusive property or right is claimed are defined as follows:

1. A condition control system having voltage storage means for creating a voltage differential within an input circuit of said system, including: condition responsive voltage divider network means including capacitor means and condition responsive means as a part of said voltage divider network means; unidirectional voltage source means connected to said condition responsive voltage divider means to apply a voltage to said condition responsive means and to charge said capacitor means to create a differential voltage in said voltage divider means; amplifier means having input means connected to said condition responsive voltage divider network means, and an output connected to solid state switch means; said solid state switch means being operated to conduct current in response to said condition responsive means; and discharge circuit means connecting said capacitor means to said solid state switch means so that said solid state switch means discharges said capacitor means when said switch means conducts thereby removing said differential voltage from said voltage divider means to provide a stable operating mode for said condition control system.

2. A condition control system as described in claim 1 wherein said condition responsive voltage divider network means is bridge means, and said amplifier means is differential amplifier means with said input means connected to said bridge means.

3. A condition control system as described in claim 2 wherein said unidirectional voltage source means includes rectifier means connected to a source of alternating current to provide a periodically varing voltage of a single polarity.

4. A condition control system as described in claim 3 wherein said condition responsive means is a temperature responsive resistor.

5. A condition control system as described in claim 4 wherein said solid state switch means includes a silicon controlled rectifier in a series circuit with a diode to prevent accidental discharge of said capacitor means.

6. A conditin control system as described in claim 5 wherein said capacitor means is a single capacitor, and said discharge circuit means includes a current limiting impedance.

* * * * *